(12) United States Patent
Sotokawa et al.

(10) Patent No.: US 9,339,941 B2
(45) Date of Patent: May 17, 2016

(54) METHOD OF PUNCHING DAMPER WITH USE OF HOLLOW PUNCH, PUNCHING APPARATUS FOR THE METHOD, AND ATTACHING APPARATUS WITH THE PUNCHING APPARATUS

(75) Inventors: Koji Sotokawa, Aikoh-gun (JP); Naoto Okubo, Aikoh-gun (JP)

(73) Assignee: NHK Spring Co., Ltd., Kanagawa (JP)

( * ) Notice: Subject to any disclaimer, the term of this patent is extended or adjusted under 35 U.S.C. 154(b) by 529 days.

(21) Appl. No.: 13/564,191

(22) Filed: Aug. 1, 2012

(65) Prior Publication Data

US 2013/0047807 A1    Feb. 28, 2013

(30) Foreign Application Priority Data

Aug. 30, 2011    (JP) .................... 2011-187991

(51) Int. Cl.
| | | |
|---|---|---|
| *B23D 25/12* | (2006.01) |
| *B26D 7/06* | (2006.01) |
| *B26D 7/14* | (2006.01) |
| *B26D 7/18* | (2006.01) |
| *B26F 1/14* | (2006.01) |
| *B26F 1/02* | (2006.01) |

(52) U.S. Cl.
CPC ............. *B26D 7/1818* (2013.01); *B26F 1/14* (2013.01); *B26F 1/02* (2013.01); *Y10T 83/06* (2015.04); *Y10T 83/2077* (2015.04)

(58) Field of Classification Search
CPC ............. B26F 1/02; B26F 1/14; B26F 1/40; B26D 7/1818
USPC .............. 83/347, 348, 325, 145, 17–21, 83/123–128, 164
See application file for complete search history.

(56) References Cited

U.S. PATENT DOCUMENTS

| 6,540,451 B1* | 4/2003 | Mori ............................ 408/135 |
| 8,151,440 B2* | 4/2012 | Tsutsumi et al. .......... 29/603.03 |
| 2006/0082018 A1* | 4/2006 | Regev ........................... 264/259 |

FOREIGN PATENT DOCUMENTS

| CN | 200998870 | 1/2008 |
| JP | 53-142968 | 12/1978 |
| JP | 2001-067635 | 3/2001 |
| JP | 200998870 | 1/2008 |
| JP | 2009-176347 | 8/2009 |

* cited by examiner

*Primary Examiner* — Kenneth E. Peterson
*Assistant Examiner* — Samuel A Davies
(74) *Attorney, Agent, or Firm* — Jordan and Hamburg LLP (57) ABSTRACT

A method punches a damper out from a damper material that is detachably attached on a flexible exfoliative member through an attaching surface of the damper material with use of a hollow punch. The method includes steps of setting the damper material on a supporting surface, positioning a projection part between the exfoliative member and the supporting surface, and punching the damper out from the damper material by cutting the damper material around the projection part by the hollow punch without punching the exfoliative member.

12 Claims, 9 Drawing Sheets

FIG.14

METHOD OF PUNCHING DAMPER WITH USE OF HOLLOW PUNCH, PUNCHING APPARATUS FOR THE METHOD, AND ATTACHING APPARATUS WITH THE PUNCHING APPARATUS

BACKGROUND OF THE INVENTION

1. Field of the Invention

The present invention relates to a method of punching a damper to be attached to an objective part of, for example, a head suspension of a hard disk, to a punching apparatus for the method and to an attaching apparatus with the punching apparatus.

2. Description of the Related Art

A hard disk drive has a disk and a head suspension for supporting a head. The head suspension allows the head to slightly float from the disk to read/write signals when the disk rotates at high speed. In such head suspension, data errors occur due to off tracks that are generated by turbulence (wind excitation), a natural vibration or the like at the time of the rotation of the disc.

To solve this problem, JP2001-067635A discloses a vibration damping technique that attaches a damper to a head suspension, the damper including a viscoelastic body layer and a constraint layer laminated on the viscoelastic body layer.

When the damper is attached to the head suspension, a damper material is prepared on an exfoliative member such as exfoliate paper that is attached on the viscoelastic body layer side of the damper material in advance. Then, the damper is punched out from the damper material to have a required shape one after another. The punched dampers are once aligned on a liner, and an attaching apparatus or a worker with a pair of tweezers etc automatically or manually picks them up to attach or stick on required parts on the head suspensions, respectively.

In this technique, the punched dampers must be aligned between the punching operation and the attaching operation, to deteriorate productivity of the head suspension. Not only that, the dampers may scatter when picking them up from the liner.

JP2009-067635A discloses that a hollow punch punches a damper out from a damper material that is prepared on an exfoliative member as mentioned above, to simultaneously hold the punched damper on a hollow inner surface thereof. The held damper is extruded from the punch to be attached on an objective part of a head suspension. This technique concatenates the punching operation and the attaching operation to improve productivity of the head suspension.

However, recent dampers vary in size according to different requirements of products (head suspensions). If a damper increase in size relative to a conventional damper, the larger damper is attached to the exfoliative member with a large attaching force. The large attaching force may be greater than a holding force of the hollow inner surface to hold the punched damper. This results in a holding error or an inability to hold the large damper.

SUMMARY OF THE INVENTION

An object of the present invention is to provide a method of punching a damper out from a damper material, a punching apparatus for the method and an attaching apparatus with the punching apparatus, capable of accurately punching and holding a damper with use of a hollow punch.

In order to accomplish the object, an aspect of the present invention provides a method of punching a damper out from a damper material that is detachably attached on a flexible exfoliative member with an attaching surface of the damper material with use of a hollow punch, the method preferably embodied by a punching apparatus or attaching apparatus according to the present invention. The aspect sets a damper material on a supporting surface so that the damper material is supported with the supporting surface through the exfoliative member, to position a projection part with respect to the supporting surface between the exfoliative member and the supporting surface. After that, the aspect punches the damper out from the damper material with the hollow punch by cutting the damper material around the projection part without punching the exfoliative member, to hold the punched damper on a hollow inner surface of the punch.

According the aspect, the exfoliative member is bent away from a cut edge of the damper around the projection part by the punch cutting out the damper, thereby promoting separation between the exfoliative member and the damper. As a result, the punched damper is accurately held by the punch.

BRIEF DESCRIPTION OF THE DRAWINGS

FIGS. 5A to 5C are side views in which

DETAILED DESCRIPTION OF EMBODIMENTS

Embodiments according to the present invention will be explained. Each embodiment positions a projection part between an exfoliative member and a supporting surface and punches a damper out from a damper material that is detachably attached on the exfoliative member by cutting the damper material around the projection part without punching the exfoliative member. This accurately punches and holds the damper with use of the hollow punch.

The projection part only has to be positioned between the exfoliative member and the supporting surface. Therefore, the projection part may be formed by a discrete part that is pinched or held between the exfoliative member and the supporting surface. Alternatively, the projection part may be formed by a part of the supporting surface or exfoliative member.

It is preferable to use a punching stage that includes the supporting surface and the projection part on the supporting surface. In this case, the projection part may be integrally or separately prepared to the supporting surface.

If the projection part is separately prepared to the supporting surface, the projection part may be configured to have a changeable projecting amount.

The projecting amount is preferably set in a range capable of preventing the damper from plastically deforming according to elasticity of the damper. This projecting amount is applied to not only the separately-prepared projection part but also the integrally-prepared projection part.

The projection part has a spherical convex shape or a truncated shape with a curved edge. The truncated projection part may have various planar shapes such as circular, rectangular or the like according to a planar shape of the damper.

A first embodiment of the present invention will be explained in detail with reference to drawings.

Figure 1:
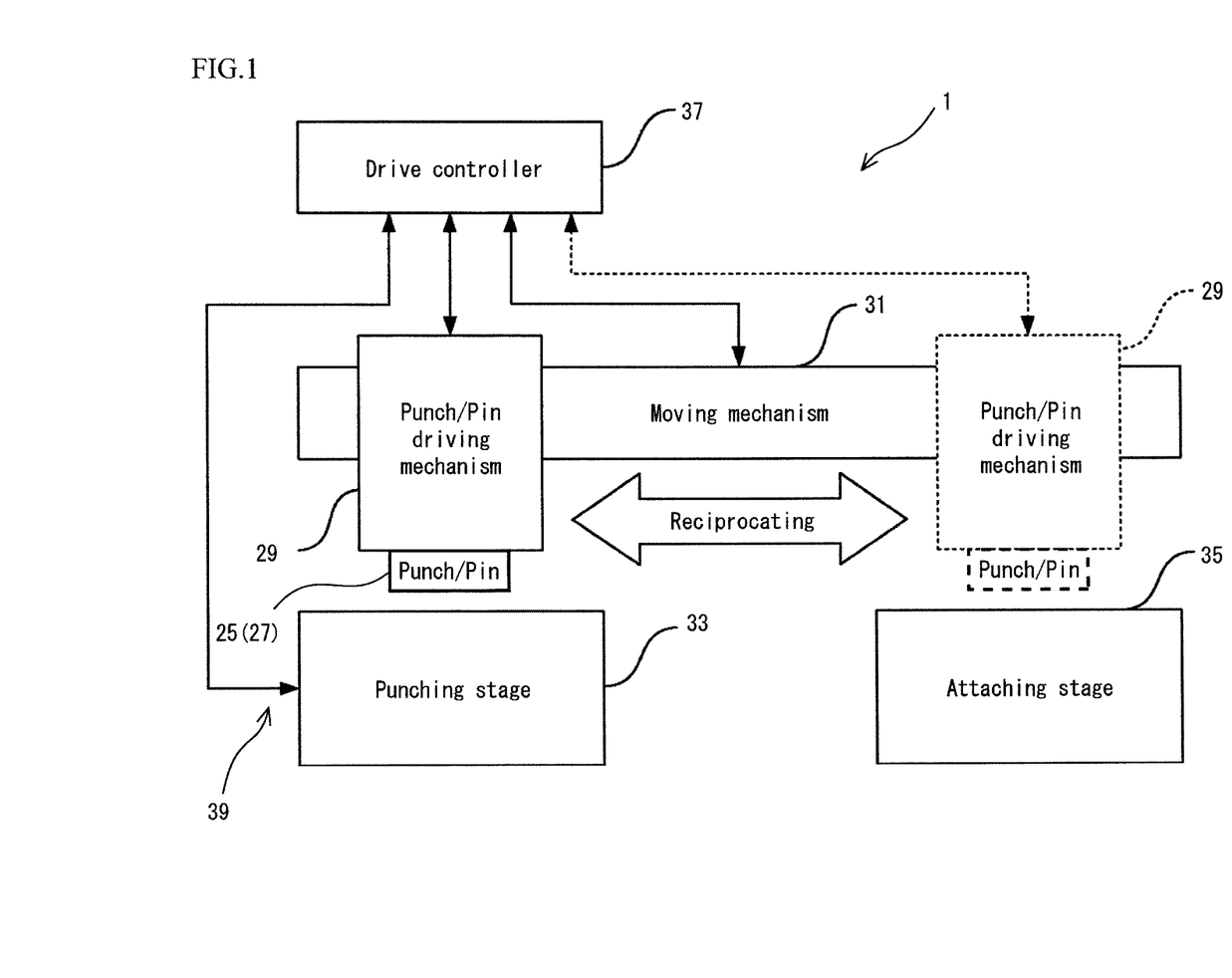
FIG. 1 is a block diagram schematically illustrating an attaching apparatus of a damper according to a first embodiment of the present invention.
Figure 2:
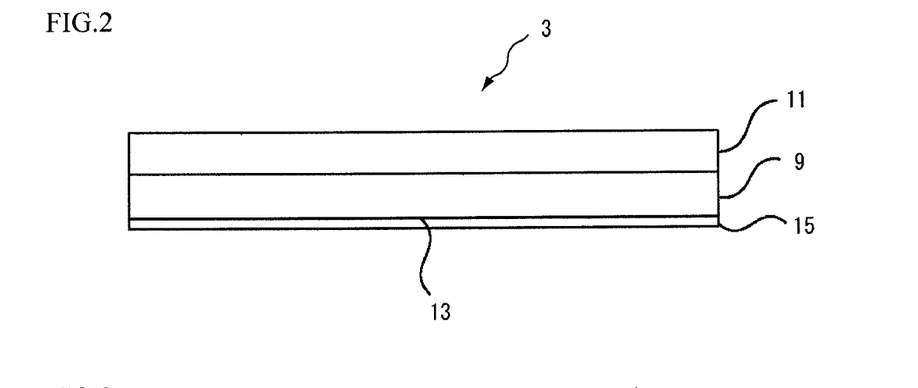
FIG. 2 is a side view illustrating a layered structure of a damper material according to the first embodiment of the present invention.
Figure 3:
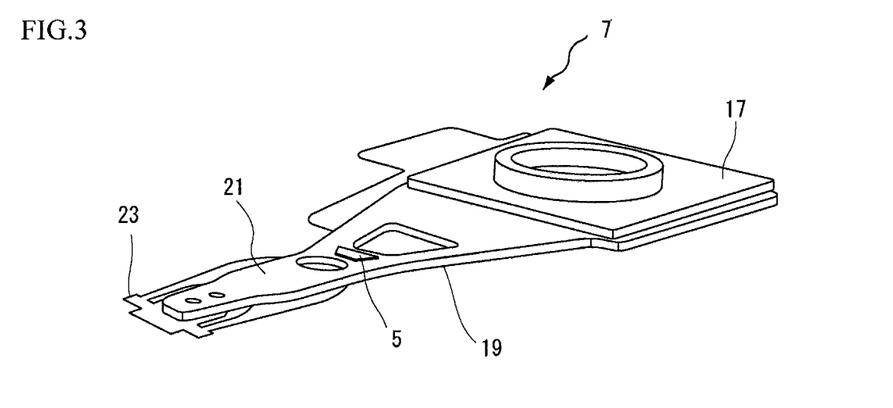
FIG. 3 is a perspective view schematically illustrating a head suspension on which the damper is attached according to the first embodiment of the present invention.
Figure 4:
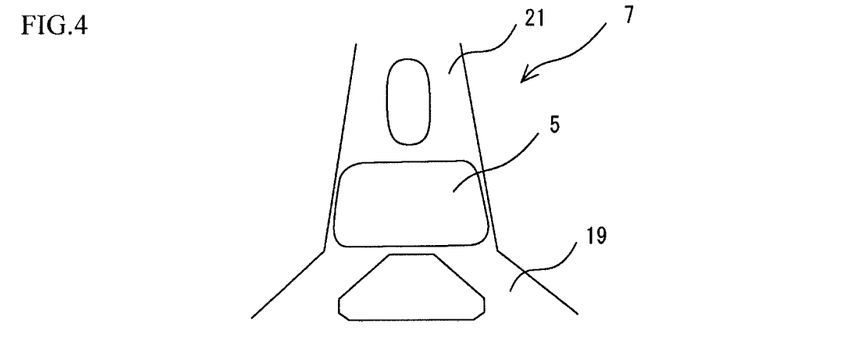
FIG. 4 is a plan view partly illustrating the head suspension of FIG. 3.

FIG. 1 is a block diagram schematically illustrating an attaching apparatus of a damper, FIG. 2 is a side view illustrating a layered structure of a damper material, FIG. 3 is a perspective view schematically illustrating a head suspension on which the damper is attached, and FIG. 4 is a plan view partly illustrating the head suspension of FIG. 3. FIGS. 3 and 4 indicate the same head suspension 7 with a damper 5, however, the head suspensions 7 in FIGS. 3 and 4 are indicated with slight differences.

According to the first embodiment, an attaching apparatus 1 of FIG. 1 punches a damper 5 out from a damper material 3 of FIG. 2 to hold the punched damper. The held damper 5 is attached to an objective part of a head suspension 7 of FIGS. 3 and 4.

The damper material 3 being an object to be punched includes a viscoelastic body layer 9 made of adhesive compound and a constraint layer 11 integrally laminated on the viscoelastic body layer 9. The viscoelastic body layer 9 has a sticking or attaching surface 13 opposite to the constraint layer 11. On the attaching surface 13, a flexible liner (separator) 15 that is an flexible exfoliative member that is detachably attached or laminated to keep an adhesiveness of the attaching surface 13.

When using the damper 5, the liner 15 is detached from the attaching surface 13 of the damper 5. The attaching surface 13 is brought into close contact with the objective part in order to attach the damper 5 to the objective part. According to the embodiment, the liner 15 is detached from the attaching surface 13 at the time of punching the damper 5.

As for a material of the viscoelastic body layer 9, it is preferred to use acrylic adhesive which is generally excellent in vibration damping properties and heat resistance, although not particularly limited. The thickness of the viscoelastic body layer 9 is usually preferred to be set to about 15 to 250 μm in view of vibration damping effect in the head suspension 7, although not limited in particular.

As for a material of the constraint layer 11, a metal plate, plastic film or the like is suitably used for example, although not limited in particular. Particularly, it is preferred that the material has the elastic modulus according to JIS K7127 (Japanese Industrial Standards) more than 2.943 $GN/m^2$ (300 $kg/mm^2$ before conversion).

In the case of the constraint layer 11 made of metal plate, a stainless plate, an aluminum plate, a copper plate, a phosphor bronze plate, a beryllium copper plate or the like may be used, for example. In the case of the constraint layer 11 made of plastic film, polyimide resin, biaxial-oriented polyethylene terephthalate (PET), biaxial-oriented polypropylene, aramid resin, polyethylenenaphthalate (PEN) or the like may be used.

The thickness of the constraint layer 11 is preferably set to about 10 to 150 μm in the case of a metal plate, and to about 20 to 200 μm in the case of plastic film, respectively, although not limited in particular.

As for a material of the liner 15, it requires a good release property with respect to the viscoelastic body layer 9, although not limited in particular. For this purpose, the liner 15 has a tentatively laminated surface processed with non-silicone series release treating agent, the tentatively laminated surface attached to the attaching surface 13.

The head suspension 7 being an object on which the damper 5 is attached supports a head to read/write signals. The head suspension 7 includes a base plate 17, a resilient part 19 and a load beam 21 that is supported with the base plate 17 through the resilient part 19 as illustrated in FIG. 3.

The load beam 21 supports a flexure 23 to which the head is attached and applies a load onto the head. The flexure 23 is fixed to the load beam 21 by, for example, spot welding. To the load beam 21, the damper 5 is attached or stuck in front of the resilient part 19 in a longitudinal direction of the head suspension 7 as illustrated in FIGS. 3 and 4.

The head suspension 7 and the damper 5 in FIGS. 3 and 4 are just one example of a head suspension and damper. The present invention is applicable to the other head suspensions and dampers with other shapes. The damper 5 may be attached to the other portion of the head suspension 7.

As illustrated in FIG. 1, the attaching apparatus 1 includes a punch 25 and an extruding pin 27 (punch/pin in FIG. 1), a punch/pin driving mechanism 29, a moving mechanism 31, a punching stage 33, an attaching stage 35, and drive controller 37. In the attaching apparatus 1 according to the embodiment, at least the punch 25 and the punching stage 33 constitutes a punching apparatus 39.

The punch 25 and extruding pin 27 are supported with the punch/pin driving mechanism 29 and are driven to perform punching operation and extruding operation, respectively. Namely, the punch/pin driving mechanism 29 serves as a punch driving mechanism and an extruder driving mechanism. The punch 25 punches the damper 5 of FIGS. 3 and 4 out from the damper material 3 of FIG. 2 and holds the punched damper 5 through the punching operation. The extruding pin 27 serves as an extruding member constituting an extruder together with the punch/pin driving mechanism 29. The extruding pin 27 extrudes the held damper 5 from the punch 5 to allow the damper 5 to be attached on the objective part through the extruding operation. The details of the punch 25 and extruding pin 27 will be explained later.

The moving mechanism 31 moves the punch/pin driving mechanism 29 so that the punch 25 reciprocates between the punching stage 33 and the attaching stage 35. With this, the moving mechanism 31 relatively moves the punch 25 to the objective part of the head suspension 7 from the punching stage 33.

The punching stage 33 allows the punch 25 to punch and hold the damper 5 thereon and the attaching stage 35 allows the punch 25 and extruding pin 27 to attach the damper 5 to the objective part of the head suspension 7. The details of the punching stage 33 and the attaching stage 35 will be explained later.

The drive controller 37 is electrically connected to the punch/pin driving mechanism 29, the moving mechanism 31 and the like to conduct drive control of them. Namely, the drive controller 37 drives the punch 25 to punch the damper 5 through the punch/pin driving mechanism 29 and then relatively moves and positions the punch 25 to the objective part through the moving mechanism 31. At the positioning state of the punch 25, the drive controller 37 drives the extruding pin 27 to extrude the damper 5 from the punch 25 through the punch/pin driving mechanism 29.

Through the drive control, the extruded damper 5 is attached on the objective part of the head suspension 7.

Figure 5A:
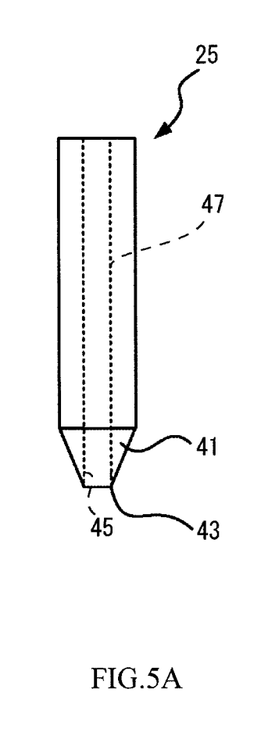
FIG. 5A illustrates a punch.
Figure 5B:
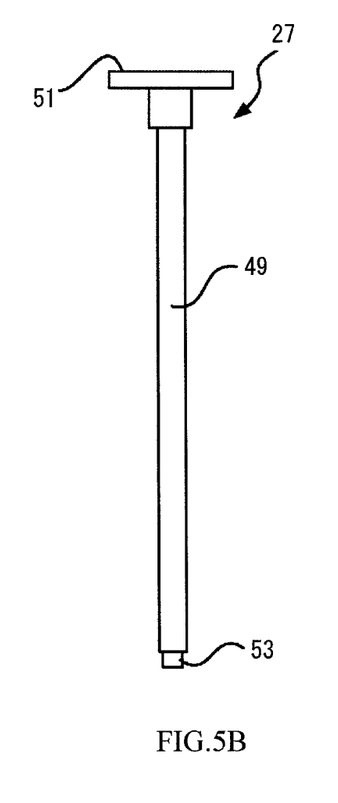
FIG. 5B illustrates an extruding pin and FIG. 5C illustrates a state of use of the punch and the extruding pin according to the first embodiment of the present invention.
Figure 5C:
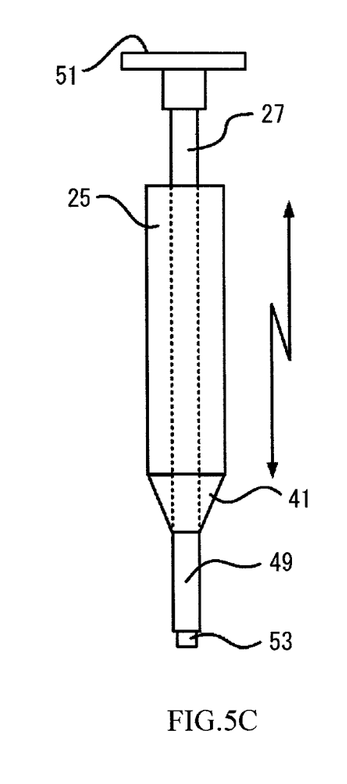

FIGS. 5A to 5C are side views in which FIG. 5A illustrates the punch, FIG. 5B illustrates the extruding pin and FIG. 5C illustrates a state of use of the punch and the extruding pin.

The punch 25 is made of, for example, metallic material such as stainless steel. The punch 25 is hollow and extends along a punching direction.

The punch 25 has a front end portion 41 in the punching direction. The front end portion 41 includes a tapered outer surface that gradually thins the front end portion 41 toward a front edge. The front end portion 41 has an opening and a tooth portion 43 defined by an opening edge according to the thinning of the front end portion 41. An inner surface 45 of the front end portion 41 serves as a hollow inner surface of the punch 25 and is polished through a smoothing process. The polished inner surface 45 allows the damper 5 to be smoothly and easily held by and extruded from the punch 25. Namely, the inner surface 45 improves a holding efficiency and extrudability of the damper 5.

The punch 25 includes a hollow inside 47 whose sectional shape corresponds to a planar shape of the damper 5. The extruding pin 27 is inserted into the hollow inside 47 of the punch 25.

The extruding pin 27 is made of, for example, metallic material such as stainless steel and is formed into a rod as a whole. The extruding pin 27 extends along an extruding direction corresponding the punching direction and is movable backward and forward along the hollow inside 47 in the extruding direction. With the forward movement, the extruding pin 27 extrudes the damper 5 from the punch 25. The extruder according to the embodiment employs the extruding pin 27 to directly push the damper 5. Instead, the extruder may be other pushing apparatus to push the damper 5 by, for example, air pressure.

The extruding pin 27 includes a shaft portion 49 whose sectional shape corresponds to the damper 5 similar to the hollow inside 47 of the punch 25. A first end of the shaft portion 49 in the extruding direction has a circular plate-like fitting portion 51 and a second end that is a front end portion of the shaft portion 49 has a small protrusion 53.

The small protrusion 53 expands a gap between the inner surface 45 of the front end 41 of the punch 25 and the outer peripheral surface of the front end portion of the extruding pin 27 to form an escaping space. The escaping space prevents the viscoelastic body layer 9 of the damper 5 from clinging to the inner surface 45 of the punch 25 when extruding the damper 5 that is punched out by and held on the inner surface 45 of the punch 25. This eliminates an obstacle with respect to the extrusion of the damper 5.

The extruding pin 27 is supported with the punch/pin driving mechanism 29 at the fitting portion 51 and the punch 25 is supported with the same at the rear end.

Therefore, the punch 25 and extruding pin 27 are driven by the punch/pin driving mechanism 29 to move backward and forward in the punching direction (extruding direction).

Figure 6:
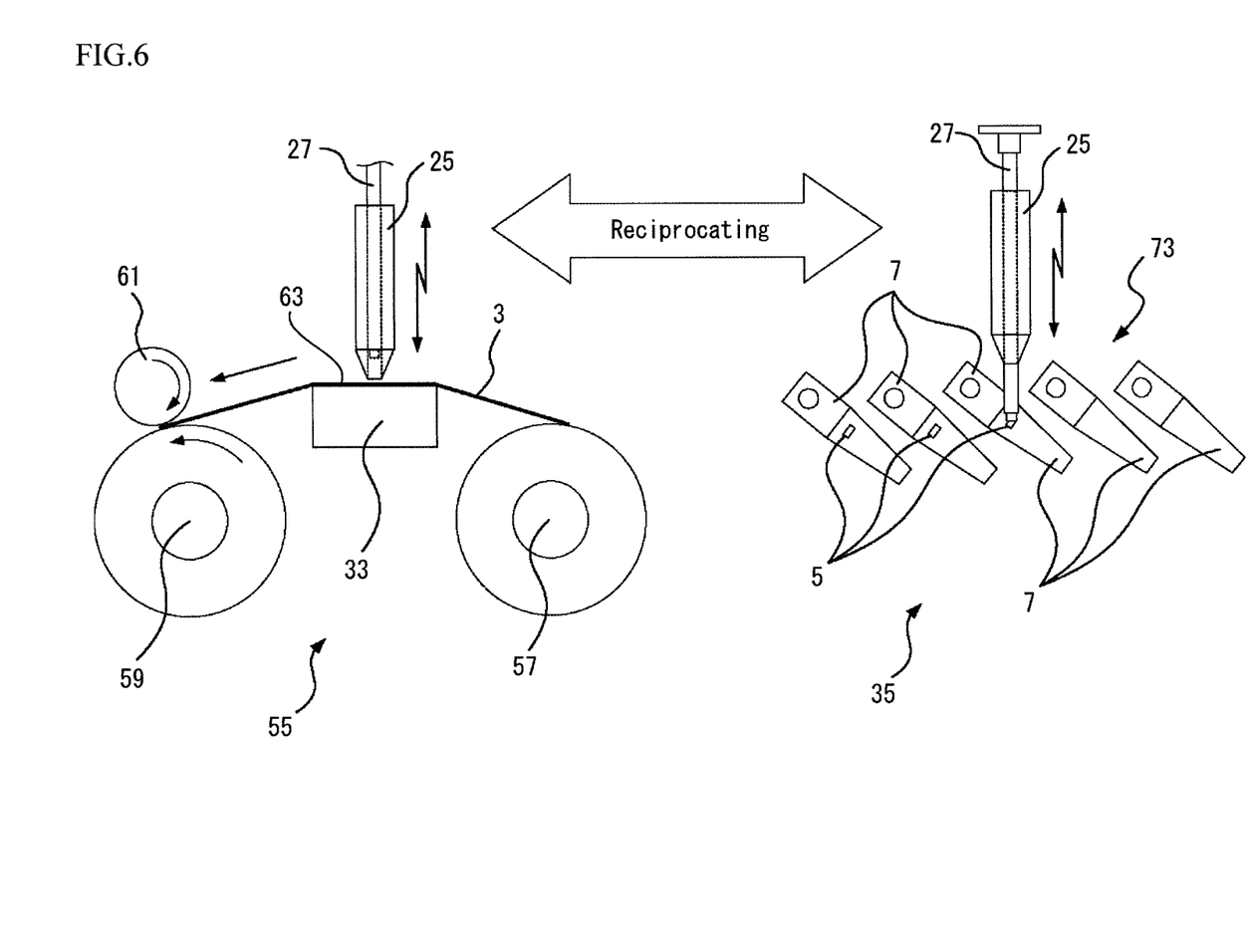
FIG. 6 is a schematic view illustrating a punching stage and an attaching stage of the attaching apparatus of FIG. 1.
Figure 7:
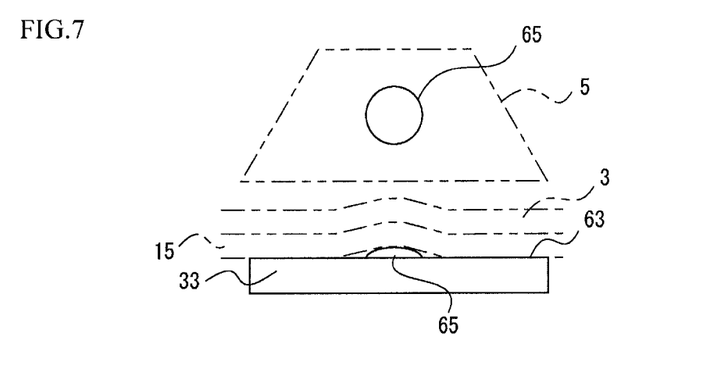
FIG. 7 is an explanatory view parallelly indicating a side view and a plan view partly illustrating the punching stage of FIG. 6.

FIG. 6 is a schematic view illustrating the punching stage and the attaching stage of the attaching apparatus of FIG. 1 and FIG. 7 is an explanatory view parallelly indicating a side view and a plan view partly illustrating the punching stage of FIG. 6.

As illustrated in FIG. 6, the punching stage 33 is provided in a feeding unit 55 of the damper material 3. The feeding unit 55 includes a driven shaft 57 and a drive shaft 59. In the feeding unit 55, a roll of a band-shaped damper material 3 that is wound around a core (not illustrated) is set to the driven shaft 57.

An end of the band damper material 3 is fixed or engaged to the drive shaft 59. To an outer periphery of the drive shaft 59, a feed roller 61 is arranged to hold the damper material 3 together with the drive shaft 59 side. The feed roller 61 is controlled by the drive controller 37 to feed the damper material 3 by a predetermined length at a predetermined timing.

The punching stage 33 is positioned between the driven shaft 57 and drive shaft 59. The punching stage 33 is formed into a rectangular block or plate and includes a supporting surface 63 for the damper material 3 as illustrated in FIGS. 6 and 7. The supporting surface 63 is defined by a top surface of the punching stage 33.

Over the supporting surface 63, the damper material 3 passes or bridges. The supporting surface 63 supports the liner 15 attached to the damper material 3 at the time of punching the damper 5 with use of the punch 25. Namely, the supporting surface 63 supports the damper material 3 through the liner 15. A supporting pin 65 is integrally formed on the supporting surface 63. The supporting pin 65 protrudes from the supporting surface 63. In this way, the punching stage 33 according to the embodiment includes the supporting surface 63 that supports the liner 15 and the supporting pin 65 that serves as a projection part with respect to the supporting surface 63 in the punching direction.

The supporting pin 65 of this embodiment has a spherical convex shape and has a circular planar shape. A diameter of the supporting pin 65 is set to about 0.6 mm. A projecting amount of the supporting pin 65 is set in a range capable of preventing the damper 5 from plastically deforming according to elasticity of the damper 5. In this embodiment, the projecting amount is regularly set to about 0.1 mm, however, it may be increased within a range less than about 0.5 mm.

The supporting pin 65 is positioned inwardly away from a cut edge of the damper 5 and partly supports the liner 15 when punching the damper 5. According to the embodiment, the damper 5 has a trapezoidal planar shape and the supporting pin 65 is positioned on or near the center of the damper 5.

The shape, number, and arrangement of the supporting pin 65 may be changed according to the shape of the damper 5 as illustrated in FIGS. 8A to 9D.

FIGS. 8A to 9D are explanatory views of variations of supporting pins 65, each parallelly indicating a side view and a plan view partly illustrating a punching stage.

Figure 8A:
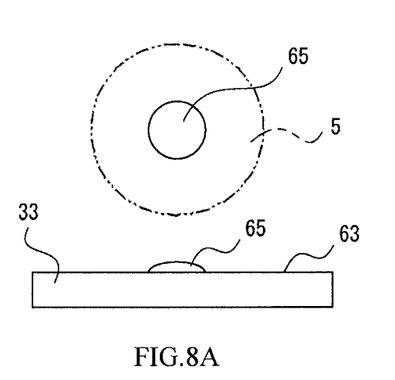
FIGS. 8A to 8D are explanatory views of variations of supporting pins according to the first embodiment, each explanatory view parallelly indicating a side vie and a plan view partly illustrating a punching stage.

In FIG. 8A, a damper 5 has a circular planar shape and a supporting pin 65 has a spherical convex shape and is positioned on the center of the damper 5 similar to FIG. 7.

Figure 8B:
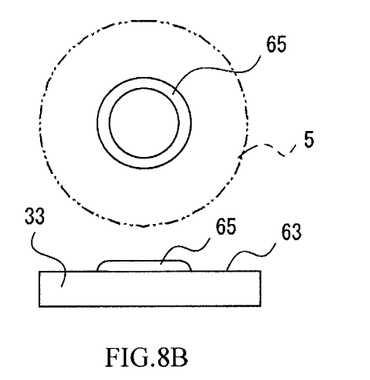

In FIG. 8B, a damper 5 has a circular planar shape whose diameter is larger than the damper 5 of FIG. 8A and a supporting pin 65 has a ring shape positioned around the center of the damper 5. The supporting pin 65 has a spherical convex sectional shape between an inner side and an outer side of the ring shape.

Figure 8C:
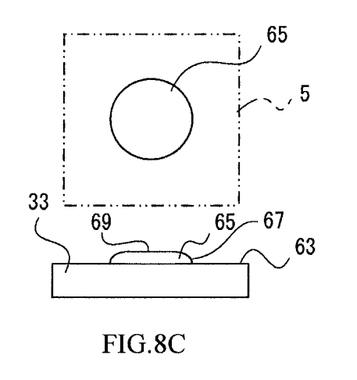
Figure 8D:
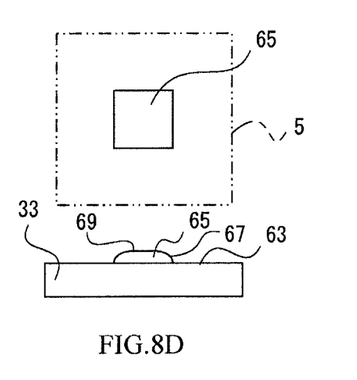

In FIGS. 8C and 8D, dampers 5 have a square planar shape. Supporting pins 65 have a circular truncated shape and a square truncated shape that are positioned on the centers of the dampers 5, respectively. Each supporting pin 65 includes a curved edge 67 adjoining to an upper surface 69.

Figure 9A:
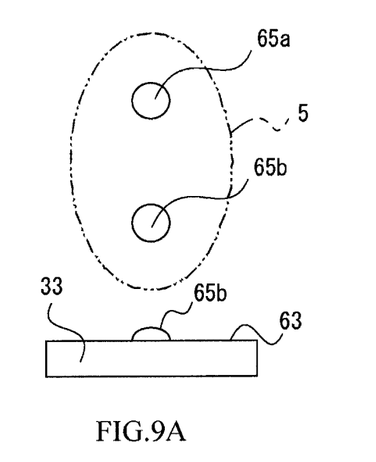
FIGS. 9A to 9D are explanatory views of variations of supporting pins according to the first embodiment, each explanatory view parallelly indicating a side vie and a plan view partly illustrating a punching stage.

In FIG. 9A, a damper 5 has an ellipsoidal planer shape. A pair of supporting pins 65a and 65b are formed to be positioned on respective ellipses. Each supporting pin 65a (65b) has a spherical convex shape.

Figure 9B:
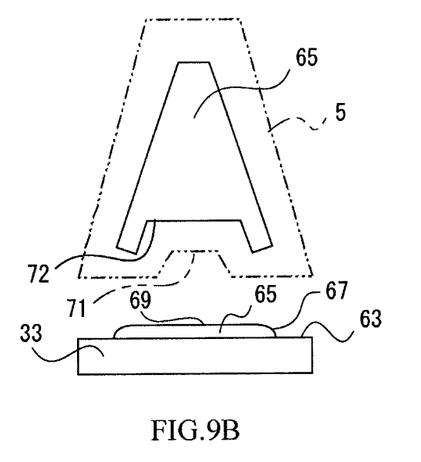

In FIG. 9B, a damper 5 has a substantial trapezoidal planar shape in which a depression 71 is formed at a base. A supporting pin 65 has a similarity planar shape, i.e., a substantial trapezoidal planar shaper with a depression 72. The planar shape of the supporting pin 65 is smaller than the damper 5.

Figure 9C:
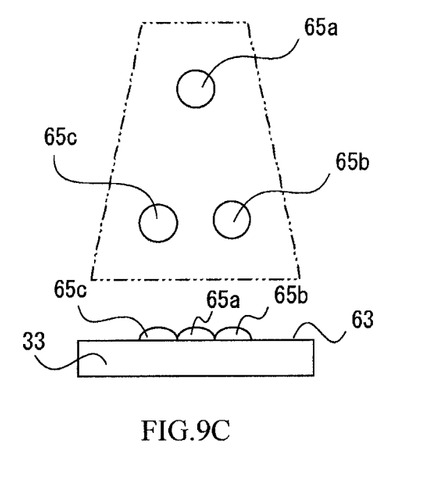

In FIG. 9C, a damper 5 has a substantial trapezoidal planar shape without a depression. Three supporting pins 65a, 65b and 65c each having a spherical convex shape are positioned around the center of the damper 5.

Figure 9D:
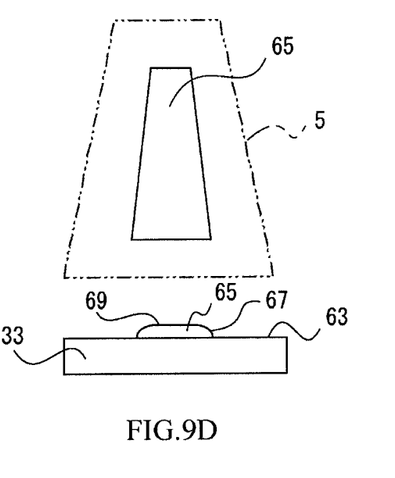

In FIG. 9D, a damper 5 has a substantial trapezoidal planar shape without a depression and a supporting pin 65 has a similarity planar shape, i.e., a substantial trapezoidal planar shape smaller than the damper 5.

The combinations of the dampers 5 and supporting pins 65 (65a, 65b, 65c) in FIGS. 7 to 9D are illustrative only. The present invention may freely combine any one of the dampers 5 and any one of the supporting pins 65 or any one set of the supporting pins 65a to 65c. For example, the supporting pin(s) 65 of FIGS. 8C to 9D is applicable to even the damper 5 of FIG. 8A. In addition, the planar shapes of the damper and supporting pin(s) may be changed into other shapes. The sectional shape of the supporting pin(s) may be also changed into other shape.

However, the supporting pin(s) 65 is required to be positioned with respect to the damper 5 in the right equilibrium so that it promotes separation between the liner 15 and the damper 5 in a whole circumference. The function or operation of the supporting pin 65 will be explained later.

As schematically illustrated in FIG. 6, the attaching stage 35 fixes a chained article 73 including a plurality of chained head suspensions 7 set to a work clamp (not shown) with jigs. The head suspension 7 may be individually fixed to the attaching stage 35.

In the attaching stage 35, the damper 5 is attached on the required objective part of each head suspension 7 of the chained article 73.

Hereinafter, the method of punching the damper 5 will be explained as the punching and attaching operations of the attaching apparatus 1.

Figure 10A:
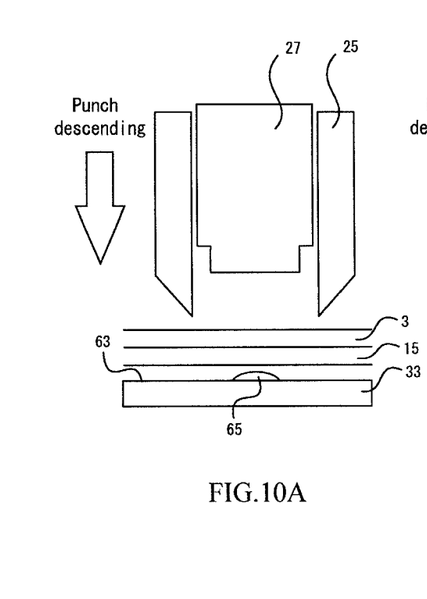
FIGS. 10A to 10C are explanatory views illustrating operations based on a method of punching a damper in time series according to the first embodiment of the present invention.
Figure 10B:
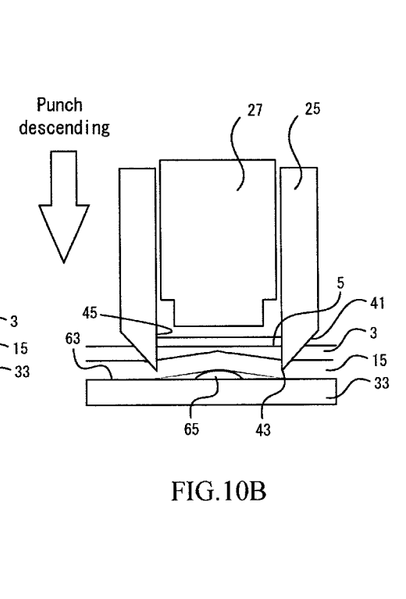
Figure 10C:
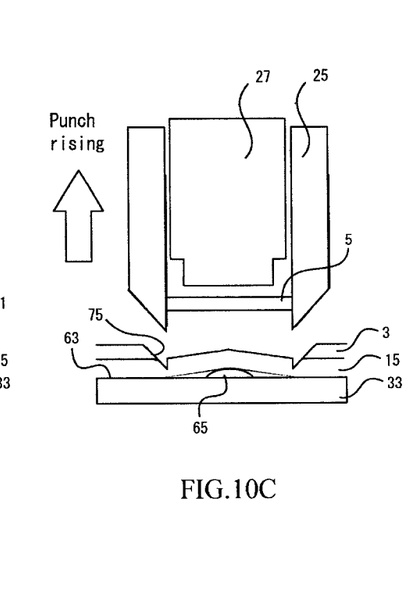
Figure 11:
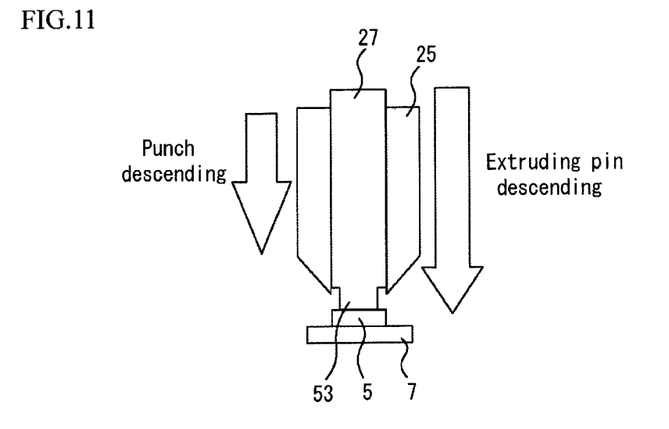
FIG. 11 is an explanatory view partly illustrating the attaching apparatus in a stage of attaching the damper to the head suspension according to the first embodiment of the present invention.

FIGS. 10A to 10C are explanatory views illustrating operations based on the method of punching the damper in time series and FIG. 11 is an explanatory view partly illustrating the attaching apparatus in the state of attaching the damper to the head suspension.

As illustrated in FIGS. 10A to 10C, the attaching apparatus 1 punches the damper 5 out from the damper material 3 in the punching operation, first. In the attaching apparatus 1, the damper material 3 has been set on the supporting surface 63 of the punching stage 33 so that the damper material 3 is supported with the supporting surface 63 through the liner 15 for the setting step of the method according to the embodiment.

Then, the attaching apparatus 1 punches the damper 5 out from the damper material 3 by cutting the damper material 3 around the supporting pin 65 without punching the liner 15 while positioning the supporting pin 65 between the liner 15 on the damper material 3 and the supporting surface 65 of the punching stage 33 as the positioning step and punching step of the method according to the embodiment.

In particular, the punch 25 over the punching stage 33 is positioned with respect to the supporting pin 65 as illustrated in FIG. 10A. With the positioning, the supporting pin 65 is positioned inwardly away from an edge of an objective portion on the damper material 3 to be punched out as the damper 5. According to the embodiment, the supporting pin 65 is positioned on the center of the objective portion as mentioned above.

In this state, the damper 5 is punched out and held by the punch 25 as illustrated in FIG. 10B. Namely, the punch 25 is driven to descend and move toward the punching stage 33, so that the tooth portion 43 passes through the damper material 3 and contacts with the liner 15. According to the embodiment, the tooth portion 43 bites the liner 15 so as not to punch the liner 15.

At this time, a portion of the liner 15 corresponding to the center of the damper 15 is supported with the supporting pin 65 at a projecting position with respect to the supporting surface 63 in the punching direction while a portion of the liner 15 corresponding to the cut edge is pressed against the supporting surface 63. The liner 15, therefore, is bent away from the cut edge of the damper 5 around the supporting pin 65, thereby promoting separation between the liner 15 and the damper 5 on the cut edge. This promotion is accelerated by a difference in rigidity between the liner 15 and the damper 5.

Additionally, the liner 15 receives tensile stress due to the bent, to generate sharing force between the liner 15 and the damper 5. The sharing force further accelerates the separation between the liner 15 and the damper 5.

According to the embodiment, the tensile stress of the liner 15 is accurately generated by the tooth portion 43 of the punch 25 biting the liner 15. This further accelerates the separation between the liner 15 and the damper 5. The tooth portion 43 may not bite the liner 15. In this case, the tooth portion 43 holds the liner 15 together with the supporting surface 63, to accurately generate the tensile stress acting on the liner 15.

When punching the damper 5, the damper material 3 is relatively pressed toward the tooth portion 43 of the punch 25. With this, the punch 25 accurately and smoothly punches the damper 5.

The punched damper 5 is held by the inner surface 45 of the punch 25 and is accurately separated from the liner 15 through the promotion of the separation between the damper 5 and the liner 15. By the punching the damper 5, a punched hole 75 is formed on the damper material 3.

Figure 12:
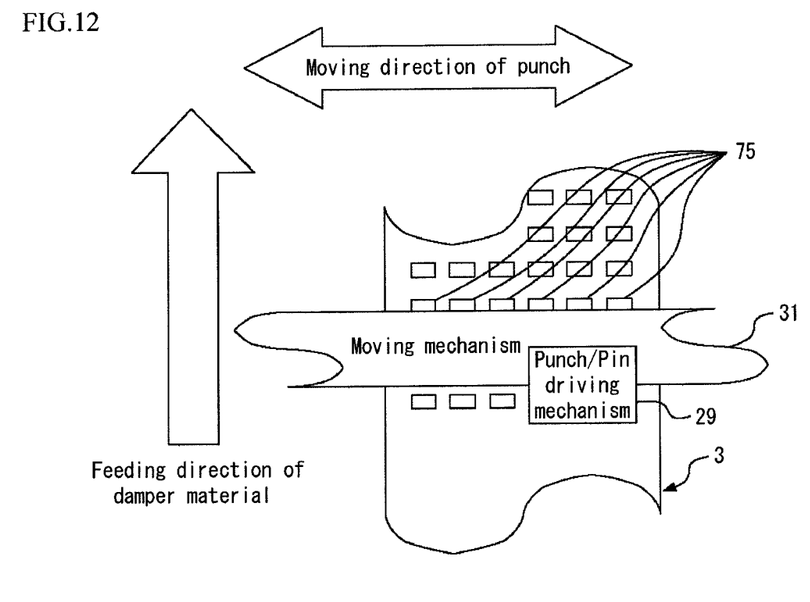
FIG. 12 is an explanatory view partly illustrating the attaching apparatus in a state of punching the damper according to the first embodiment of the present invention.

The attaching apparatus 1 repeats the punching operation as illustrated in FIG. 12. The repeated punching operations of the punch 25 are continuously conducted in the moving direction of the punch/pin driving mechanism 29 while feeding the damper material 3. The moving direction of the punch/pin driving mechanism 29 or punch 25 is orthogonal to the feeding direction of the damper material 3.

With this configuration, the attaching apparatus 1 punches two or more dampers 5 out along a widthwise direction of the band-shaped damper material 3. This results in a smooth work while improving the material yield.

In each punching operation, the punch 25, after holding the damper 5 and raises and moves away from the supporting surface 63 as illustrated in FIG. 10C. At this time, the held damper 5 is completely separated from the liner 15. Then, the punch 25 is positioned relative to the objective part of the head suspension 7 on the attaching stage 35 as illustrated in FIG. 11.

In the positioning state, the attaching operation or extruding operation is carried out. Namely, the punch 25 descends toward the attaching stage 35 and then the extruding pin 27 inside the punch 25 descends toward the attaching stage 35. Therefore, the held damper 5 is extruded from the punch 25 and is attached on the objective part with the attaching surface 13.

The inner surface 45 of the front end portion 41 of the punch 25 is polished through a smoothing process and the front end portion of the extruding pin 27 in the extruding direction is provided with the small protrusion 53. Therefore, it can prevent the viscoelastic body layer 9 of the damper 5 from clinging, so that it eliminates an obstacle with respect to the extrusion of the damper 5.

The first embodiment provides at least following effects.

According the first embodiment, the method punches the damper 5 out from the damper material 5 that is detachably attached on the flexible liner 15 with the attaching surface 13 of the damper material 3 with use of the hollow punch 25. The method comprises the steps of setting the damper material 3 on the supporting surface 63 so that the damper material 3 is supported with the supporting surface 63 through the liner 15 (setting step), positioning the supporting pin 65 with respect to the supporting surface 63 between the liner 15 and the supporting surface 63 (positioning step), and punching the damper 5 out from the damper material 3 with the hollow punch 25 by cutting the damper material 3 around the supporting pin 65 without punching the liner 15, to hold the punched damper 5 on the hollow inner surface 45 of the punch 25 (punching step). The punch 25 allows the held damper 5 to be extruded therefrom to be attached on the objective part with the attaching surface 13.

The method according to the first embodiment bends the liner 15 away from the cut edge of the damper 5 around the supporting pin 65 when punching and holding the damper 5 with use of the hollow punch 25, thereby promoting separation between the liner 15 and the damper 5 on the cut edge.

Even if the damper 5 is larger than a conventional damper to increase an attaching force of the damper 5 to the liner 15, the method accurately separates the damper 5 from the liner 15. As a result, the punch 25 accurately punches and holds the damper 5 regardless of the size of the damper 5.

According to the embodiment, the tensile stress acts on the liner 15 due to the bent of the liner 15, to generate the sharing force between the liner 15 and the damper 5. The sharing force accelerates the separation between the liner 15 and the damper 5.

The tooth portion 43 passes through the damper material 3 and bites the liner 15 so as not to punch the liner 15 when punching the damper 5 out from the damper material 3. Therefore, the tensile stress of the liner 15 is accurately generated, to further accelerate the separation between the liner 15 and the damper 5.

The damper material 3 includes the viscoelastic body layer 9 and the constraint layer 11 laminated on the viscoelastic body layer 9. The elasticity or resiliency of the damper material 3 cooperates with the bent of the liner 15, to further accelerate the separation between the liner 15 and the damper 5.

The punching apparatus 39 embodying the method has the punching stage 33 including the supporting surface 63 that supports the damper material 3 through the liner 15 and the supporting pin 65 projecting from the supporting surface 63, and the hollow punch 25 having the hollow inner surface 45 formed to punch the damper 5 out from the damper material 3 around the supporting pin 65 and hold the punched damper 5 thereon.

Therefore, the punching apparatus 39 easily and accurately positions the supporting pin 65 between the liner 15 and the supporting surface 63 to easily and accurately realize the method according to the embodiment.

The supporting pin 65 has the spherical convex shape or the truncated shape with the curved edge 67. This prevents damage of the punched damper 5.

The punching apparatus 39 sets the supporting pin 65 to have the projecting amount in a range capable of preventing the damper 5 from plastically deforming according to elasticity of the damper 5. This accurately prevents damage of the punched damper 5.

The hollow inner surface 45 of the punch 25 is smoothed relative to the other portion, so that the damper 5 is smoothly accurately extruded from the punch 25.

The attaching apparatus 1 having the punching apparatus 39 has the extruder (the extruding pin 27 and the punch/pin driving mechanism 29) to extrude the held damper 5 from the punch 25 and attach the extruded damper 5 on the objective part of the head suspension 7 with the attaching surface 13. Therefore, the attaching apparatus 1 accurately attaches the damper 5 held by the punch 25 to the objective part.

The extruder includes the extruding pin 27 as the extruding member that is inserted into the hollow punch 25 to move backward and forward in the extruding direction.

Therefore, the extruding pin 27 accurately extrudes the held damper 5 from the punch 25 and attach the extruded damper 5 to the objective part.

The front end portion of the extruding pin 27 in the extruding direction is smaller than the hollow inner surface 45 of the punch 25 holding the punched damper 5. This further accurately extrudes the held damper 5 from the punch 25.

The attaching apparatus 1 includes the punch/pin driving mechanism 29 driving the punch 25 and the extruding pin 27, the moving mechanism 31 relatively moving the punch 25 that holds the punched damper 5 to the objective part of the head suspension 7 from the punching stage 33, the drive controller 37 connected to the punch/pin driving mechanism 29 and moving mechanism 31 and controlling them.

Under the control of the drive controller 37, the punch 25 is driven by the punch/pin driving mechanism 29 to punch and hold the damper 5, the punch 25 holding the punched damper 5 relatively moves and positions to the objective part of the head suspension 7 through the moving mechanism 31, and the extruding pin 27 is driven by the punch/pin driving mechanism 29 to extrude the held damper 5 and attach it on the objective part.

The attaching apparatus 1, therefore, automates from the punching operation to the attaching operation through the punch 25 that accurately punches and holds the damper 5. It improves the productivity of the head suspension 7.

Figure 13:
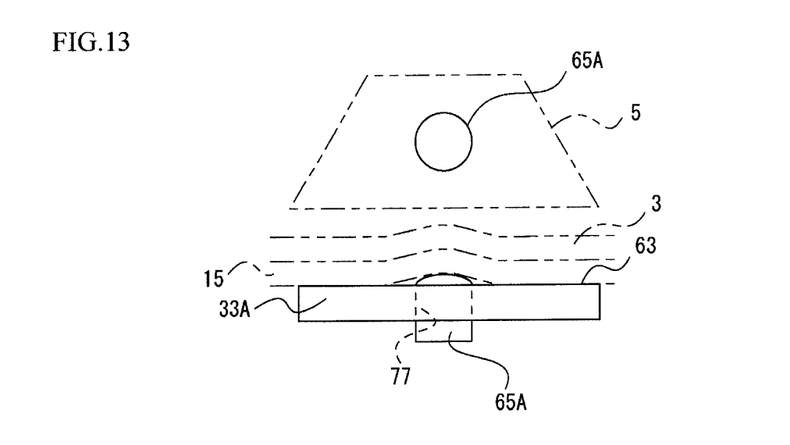
FIG. 13 is an explanatory view parallelly indicating a side vie and a plan view partly illustrating a punching stage according to a second embodiment.

A second embodiment of the present invention will be explained with reference to FIG. 13. FIG. 13 is an explanatory view parallelly indicating a side vie and a plan view partly illustrating a punching stage. The second embodiment has the same parts as the first embodiment. Accordingly, the same parts are represented with the same reference marks or the same reference marks with "A" to omit a repetition of explanation.

According to the second embodiment, the punching stage 33A has a discrete supporting pin 65A movable in a punching direction of a punch 25. Namely, the punching stage 33A has a through-hole 77 formed therethrough in a thickness direction. Into the through-hole 77, the supporting pin 65A is inserted and is supported movable backward and forward in the punching direction.

A front end of the supporting pin 65A protrudes from a supporting surface 63 of the punching stage 33A. The base end of the supporting pin 65A is attached to an actuator (not illustrated) that moves the supporting pin 65A backward and forward. The movement of the supporting pin 65A is controlled by a drive controller 37. Under the control of the drive controller 37, the supporting pin 65A retracts so as not to protrude from the supporting surface 63 when the damper material 3 is fed on the punching stage 33A and advances so as to protrude from the supporting surface 63 when the damper 5 is punched out.

The second embodiment smoothly feeds the damper material 3 in addition to the same effects as the first embodiment.

Additionally, the second embodiment adjusts a protruding amount of the supporting pin 65A from the supporting surface 63 through adjustment of the advancing amount of the supporting pin 65A.

Figure 14:
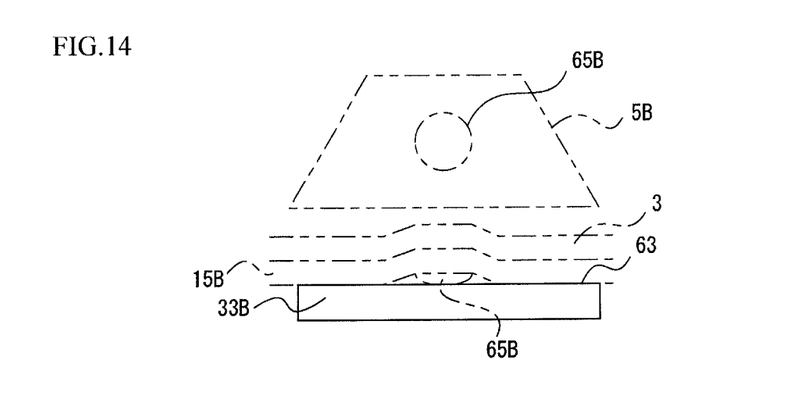
FIG. 14 is an explanatory view parallelly indicating a side vie and a plan view partly illustrating a punching stage according to a third embodiment.

A third embodiment will be explained with reference to FIG. 14. FIG. 14 is an explanatory view parallelly indicating a side vie and a plan view partly illustrating a punching stage. The third embodiment has the same parts as the first embodiment. Accordingly, the same parts are represented with the same reference marks or the same reference marks with "B" to omit a repetition of explanation.

According to the third embodiment, a punching stage 33B has no supporting pin and a liner 15B set on a damper material 3 integrally has a projection 33B as a projection part. The projection 33B is formed at each objective part of the damper material 3 to be punched out as a damper 5.

The third embodiment easily and accurately positions the projection 33B between a supporting surface 63B and the liner 15B while using an existing punch and an existing punching stage without a supporting pin.

This easily and accurately realizes the method of punching the damper 5 according to the present invention.

In addition, the third embodiment provides the same effects as the first embodiment.

What is claimed is:

1. A method of punching a damper out from a damper material that is detachably attached on a flexible exfoliative member through an attaching surface of the damper material with use of a hollow punch having a tooth portion at a front end of the punch, comprising the steps of:
    setting the damper material on a supporting surface so that the damper material is supported with the supporting surface through the exfoliative member, the supporting surface having a first part positioned inside a punching range of the punch and a second part positioned outside the punching range and adjoining to the first part so that the second part is on a same level with the first part;
    positioning a projection part with respect to the first part of the supporting surface between the exfoliative member and the first part of the supporting surface; and
    punching the damper out from the damper material by cutting the damper material around the projection part by the hollow punch without punching the exfoliative member, while the projection part is positioned between the exfoliative member and the first part of the supporting surface, and a clearance being larger than a thickness of the exfoliative member is kept between the tooth portion and the projection part in a lateral direction perpendicular to a punching direction along which the punch punches out the damper, so that a front end portion of the hollow punch passes through the damper material and at least contacts with the exfoliative member to bend the exfoliative member away from a cut edge of the punched damper around the projection part when said cutting, to promote separation between the exfoliative member and the punched damper and hold the punched damper on a hollow inner surface of the punch.

2. The method of claim 1, wherein
    the punch cuts the damper material by a tooth portion formed at a front end of the punch, and
    the tooth portion passes through the damper material and bites the exfoliative member so as not to punch the exfoliative member when punching the damper out from the damper material.

3. The method of claim 1, wherein
    the damper material including a viscoelastic body layer and a constraint layer laminated on the viscoelastic body layer so that the viscoelastic body layer forms the attaching surface.

4. A punching apparatus for the method of claim 1, comprising:
    a punching stage including the supporting surface that supports the damper material through the exfoliative member and the projection part from the supporting surface; and
    wherein the hollow punch has a hollow inner surface formed to punch the damper out from the damper material around the projection part while the projection part is positioned between the exfoliative member and the supporting surface and hold the punched damper at the hollow inner surface of the punch;
    wherein the hollow punch has a tooth portion at a front end thereof; and
    wherein said clearance larger than the thickness of the exfoliative member is kept between the tooth portion and the projection part in said lateral direction perpendicular to the punching direction along which the hollow punch punches out the damper.

5. The punching apparatus of claim 4, wherein the projection part has a spherical convex shape or a truncated shape with a curved edge that gradually enlarges in the lateral direction, and wherein the projection part has a sectional shape toward the supporting surface in the punching direction according to a curvature of the curved edge.

6. The punching apparatus of claim 4, wherein the projection part has a projecting amount set in a range capable of preventing the damper from plastically deforming according to elasticity of the damper.

7. The punching apparatus of claim 4, wherein the hollow inner surface of the punch is made to be smoothed relative to the other portion.

8. An attaching apparatus having the punching apparatus of claim 4, further comprising:
    an extruder that extrudes the held damper from the punch to attach the damper on an objective part with the attaching surface.

9. The attaching apparatus of claim 8, wherein the extruder includes an extruding member that is inserted into the hollow punch to move backward and forward in an extruding direction.

10. The attaching apparatus of claim 9, a front end portion of the extruding member in the extruding direction is smaller than the hollow inner surface of the punch holding the punched damper.

11. The attaching apparatus of claim 8, further comprising:
- a punch driving mechanism driving the punch to punch and hold the damper;
- a moving mechanism relatively moving the punch holding the punched damper to the objective part from the punching stage;
- an extruder driving mechanism driving the extruder to extrude the held damper from the punch;
- a drive controller controlling the punch driving mechanism, moving mechanism, extruder driving mechanism, so that the punch is driven by the punch driving mechanism to punch and hold the damper, the punch holding the punched damper relatively moves and positions to the objective part through the moving mechanism, and the extruder is driven by the extruder driving mechanism to extrude the held damper and attach the extruded damper on the objective part.

12. A method of punching a damper out from a damper material that is detachably attached on a flexible exfoliative member through an attaching surface of the damper material with use of a hollow punch, the hollow punch having a tooth portion at a front end thereof and being operable to move in a movement direction and perform a punching movement and a punch return movement, the method comprising the steps of:
- setting the damper material with attached exfoliative member on a supporting surface, so that the exfoliative member is supported in contact with the supporting surface, the supporting surface having a first part positioned inside a punching range of the hollow punch and a second part positioned outside the punching range and adjoining to the first part so that the second part is on a same level with the first part;
- positioning the damper material with attached exfoliative member, as part of said setting, so that a projection part is situated between the exfoliative member and the first part of the supporting surface; and
- punching out the damper from the damper material without punching the exfoliative member by cutting the damper material around the projection part with the hollow punch during said punching movement, wherein during said punching the projection part remains positioned between the exfoliative member and the first part of the supporting surface, so that a front end portion of the punch passes through the damper material and at least contacts with the exfoliative member to bend the exfoliative member away from a cut edge of the punched damper around the projection part when said cutting; and
- promoting by the projection part separation of the damper material from the exfoliative member during said punching due to a configuration of the projection part, so that said punched damper is held on a hollow inner surface of the punch during said punch return movement; and
- wherein said clearance larger than the thickness of the exfoliative member is kept between the tooth portion and the projection part in said lateral direction perpendicular to the punching direction along which the hollow punch punches out the damper.

* * * * *